US007934847B2

(12) United States Patent
Oomori et al.

(10) Patent No.: US 7,934,847 B2
(45) Date of Patent: *May 3, 2011

(54) POWER TOOL WITH LIGHT UNIT

(75) Inventors: Katsuhiro Oomori, Hitachinaka (JP); Chikai Yoshimizu, Hitachinaka (JP); Hidekazu Harada, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 375 days.

This patent is subject to a terminal disclaimer.

(21) Appl. No.: 11/709,741

(22) Filed: Feb. 23, 2007

(65) Prior Publication Data

US 2007/0159812 A1 Jul. 12, 2007

Related U.S. Application Data

(63) Continuation of application No. 10/502,010, filed on Jul. 20, 2004, now Pat. No. 7,185,998.

(51) Int. Cl.
*B25B 23/18* (2006.01)
*B23G 1/48* (2006.01)
*F21V 33/00* (2006.01)

(52) U.S. Cl. .......................................... 362/119; 408/16

(58) Field of Classification Search .................. 362/119, 362/120; 408/16
See application file for complete search history.

(56) References Cited

U.S. PATENT DOCUMENTS 2,310,166 A * 2/1943 Way .............................. 362/119
2,525,588 A 10/1950 Cameron
2,855,679 A 10/1958 Gibble
4,215,480 A * 8/1980 Fisher et al. .................... 33/706
4,431,062 A * 2/1984 Wanner et al. ................ 173/104
4,480,295 A * 10/1984 Shuster ......................... 362/109
4,877,042 A * 10/1989 Downey ........................ 132/212
4,883,942 A * 11/1989 Robak et al. .................. 219/227
4,944,464 A * 7/1990 Zelenka ..................... 242/564.4
5,168,780 A 12/1992 Van Gennep
5,169,225 A 12/1992 Palm
5,320,177 A * 6/1994 Shibata et al. .................. 173/48
5,412,546 A * 5/1995 Huang .......................... 362/119
5,473,519 A * 12/1995 McCallops et al. ........... 362/120
5,793,130 A * 8/1998 Anderson ..................... 362/119
5,897,454 A * 4/1999 Cannaliato .................... 475/265
6,168,287 B1 1/2001 Liu
6,206,538 B1 * 3/2001 Lemoine ....................... 362/119
6,318,874 B1 11/2001 Matsunaga
6,364,033 B1 * 4/2002 Hung et al. ................... 173/217
(Continued)

FOREIGN PATENT DOCUMENTS

CN 2210755 Y 10/1995
CN 2365021 Y 2/2000
(Continued)

*Primary Examiner* — Alan Cariaso
(74) *Attorney, Agent, or Firm* — Antonelli, Terry, Stout & Kraus, LLP.

(57) ABSTRACT

A power tool includes a motor as a drive power source, a body housing the motor and having an end output unit for chucking an end tool, a handle grip connected to the body; and a light unit disposed to one of the handle grip and the body, and having a light-emitting element for providing illumination near the end tool. The light unit comprises switch means for switching the light-emitting element on and off, and an off circuit for automatically turning the light-emitting element off at a predetermined time after the light-emitting element turns on.

19 Claims, 9 Drawing Sheets

U.S. PATENT DOCUMENTS

| | | | | |
|---|---|---|---|---|
| 6,494,590 | B1 * | 12/2002 | Paganini et al. | 362/119 |
| 6,502,949 | B1 * | 1/2003 | Horiyama et al. | 362/119 |
| 6,565,227 | B1 | 5/2003 | Davis | |
| 6,785,950 | B1 * | 9/2004 | Scirbona et al. | 29/566.4 |
| 6,814,461 | B2 * | 11/2004 | Minalga | 362/119 |
| 7,185,998 | B2 * | 3/2007 | Oomori et al. | 362/119 |
| 2002/0131267 | A1 | 9/2002 | Van Osenbruggen | |

FOREIGN PATENT DOCUMENTS

| | | |
|---|---|---|
| EP | 1 072 842 | 1/2001 |
| FR | 2 523 891 | 9/1983 |
| JP | 1-117882 | 8/1989 |
| JP | 6-246645 | 9/1994 |
| JP | 8-252778 | 10/1996 |
| JP | 10-34564 | 2/1998 |
| JP | 10-34565 | 2/1998 |
| JP | 10-34566 | 2/1998 |
| JP | 2001-300867 | 10/2001 |
| WO | WO 99/02310 | 1/1999 |
| WO | WO 01/08228 | 2/2001 |

* cited by examiner

POWER TOOL WITH LIGHT UNIT

CROSS REFERENCE TO RELATED APPLICATION

This application is a continuation application of U.S. application Ser. No. 10/502,010, filed Jul. 20, 2004, now U.S. Pat. No. 7,185,998, the contents of which are incorporated herein by reference.

TECHNICAL FIELD

The present invention relates to a power tool that has a light for illuminating a fastener affixed to a workpiece or illuminating the bit used to drive the fastener.

BACKGROUND ART

Power tools used to drive a screw or other threaded fastener by way of a bit or other end tool, and having a light, are now common. When the power tool is used in a dark place, the light illuminates both the fastener being affixed to the workpiece, and the bit used to drive the fastener, thereby making it easier to use the power tool in dark places.

More specifically, as shown in FIG. 14, this power tool 401 has a body 410, and inside the body 410 has a motor not shown as the drive source, and mechanical parts not shown for transferring torque from the motor not shown. An end output unit not shown is housed near the distal end inside the body 410, and a tool chuck 411 is disposed to this distal end. The tool chuck 411 is drivably linked to the end output unit not shown, and an end tool is chucked in the tool chuck 411. The end output unit not shown is drivably linked inside the body 410 to the motor not shown through the mechanical parts not shown, torque from the motor is thereby transferred to the end output unit, and the end output unit is thus driven. By thus driving the chucked end tool not shown, the screw or other fastener can be tightened to the workpiece or loosened.

A handle grip 410C that is gripped by the user when using the power tool is rendered integrally to the body 410. A pull trigger 413 for starting and stopping driving the motor not shown is disposed at the top part of the handle grip 410C. As shown in FIG. 14, a light unit 420 is externally affixed to a position on top of the body 410. The light unit 420 has a light-emitting element not shown, and can thereby illuminate a fastener not shown that is driven by the end tool not shown. A battery pack 412 is also disposed at the bottom part of the handle grip 410C. This battery pack 412 houses a battery not shown that is the power source for supplying power, and the battery not shown is electrically connected to the motor not shown.

When constructing wood-frame houses, wood members are often fastened with metal fasteners in confined spaces. With the prior art power tool 401 described above, however, the light unit 420 is disposed externally at a position on the top of the body 410 as described above, and the light unit 420 therefore often gets in the way and makes attaching fasteners difficult. Japanese laid open Utility Model application publication No. H1-117882 teaches as a power tool solving this problem a power tool 501 having a light unit 520 disposed externally to the body 510 in front of the trigger 513 as shown in FIG. 15.

With the conventional power tool 501 described in the Japanese Utility Model application publication No. H1-117882, however, the light unit 520 interferes with the index finger of the user operating the trigger 513 because the light unit 520 is disposed externally to the body 510 in front of the trigger 513. To solve this problem, laid open Japanese Utility Model application publication Nos. S55-151409 and H3-79279, and laid open Japanese Patent Application publication No. H10-44064 teach power tools having a light unit rendered not at a position on the top of the body nor at a position in front of the trigger, but at a position externally to the body in the vicinity of the end output unit or at the bottom of the grip.

In each of the power tools described above, however, the lighting angle of the light unit is fixed. The tools chucked into the end of such power tools, however, vary in length from 60 mm to 150 mm. A problem here is that because the lighting angle is fixed with such conventional power tools, light cannot always thrown onto the fitting between the bit and the head of the screw used as the fastener, or on the tip of the screw, when the bit is changed, and it becomes difficult to see.

Furthermore, because the light unit is fixed directly to the body, vibration produced when using the power tool can result in continuity failures in the light-emitting element or wiring failures.

In order to avoid this problem, Japanese laid open Patent Application Publication No. 2001-300867 discloses a power tool in which the light unit has a flexible shaft extending from the bottom of the handle grip. A light-emitting element is disposed at the distal end of this flexible shaft. Because the flexible shaft can be bent to any desired direction, the lighting angle of the light-emitting element can be freely adjusted.

A problem with the conventional power tool described in the Japanese Patent Application Publication No. 2001-300867, however, is that vibration produced from using the power tool causes the light from the the light-emitting element to waver because the lighting angle of the light-emitting element is held by the flexible shaft, and it is difficult to see the target.

Furthermore, power tools described in Japanese Utility Model application Kokai Nos. H3-79279, H1-117882 and S55-151409 have a switch for turning illumination from the light-emitting element on and off. If, for example, the user forgets to turn the switch off, the battery is consumed even though the light is not being used, and the light then may not turn on when it is actually needed.

Yet further, with each of the conventional power tools described above the light-emitting element projects light from only one direction. As a result, the light casts a shadow of the end tool onto the workpiece when the bit is fit into the screw head, making it difficult to see. Furthermore, white incandescent lights are generally used for the light-emitting element in the prior art, but contrast is low and a relatively high wattage incandescent light must be used to achieve sufficient brightness. The power supply must therefore become bulky, and this degrades operability.

Furthermore, when working in high, dimly lit places on a stepladder, for example, there is no place to set the power tool. A hook is therefore needed to hang the power tool on the user's belt or ladder, for example, when it is not being used. However, providing both a hook and a light unit on the power tool increases both the size and cost of the power tool.

Therefore, an object of the present invention is to provide a power tool having a light unit that does not get in the way, and which enables adjusting the lighting angle of the light unit without the emitted light shaking.

A further object of the invention is to provide a power tool that prevents depletion of the power supply due to the light switch of the light unit not being turned off.

A yet further object of the invention is to provide a power tool that is resistant to continuity failures in the light-emitting element and interruptions in wiring members.

A yet further object of the invention is to provide a small, economical power tool.

A yet further object of the invention is to provide a power tool providing high contrast illumination and capable of minimizing generation of a shadow of the end tool.

DISCLOSURE OF THE INVENTION

A power tool according to the present invention includes a motor as a drive power source, a body housing the motor and having an end output unit for chucking an end tool driving a fastener, a handle grip provided integrally with the body, and a light unit disposed at a bottom part of the handle grip and having a light-emitting element for illuminating a fastener located at a distal end of the end tool. The end tool is driven by the motor to tighten the fastener into a workpiece. The light unit includes a lighting angle adjusting and holding means capable of adjusting a lighting angle of the light-emitting element according to a length of the end tool and fastener, and capable of holding the adjusted lighting angle.

With a power tool thus constructed, the lighting angle can be fixed and held by the lighting angle adjusting and holding means after the lighting angle is adjusted. As a result, the fastener or other illuminated object can be stably illuminated without the light shaking.

More specifically, in the power tool according to the present invention, the light unit includes a pivot shaft supported rotatably about its axis at a bottom part of the handle grip, and a lever having a base end integrally connected to one end of the pivot shaft and having a free end provided with the light-emitting element. The lever is pivotally moved about the axis of the pivot shaft. The lighting angle adjusting and holding means includes engaging teeth provided integrally with the bottom part of the handle grip, fitting teeth provided integrally with the pivot shaft and meshedly engageable with the engaging teeth, a resilient member for urging the fitting teeth in one direction in the axial direction of the pivot shaft to ensure meshing engagement between the fitting teeth and the engaging teeth, and a removal prevention means that is movable in unison with the pivot shaft for preventing the pivot shaft from separating away from the bottom part of the handle grip, when the lever is operated to be moved in an opposite direction to the one direction against the urging force of the resilient member to disengage the fitting teeth from the engaging teeth. The resilient member is interposed between the bottom part of the handle grip and the removal prevention means.

Yet more specifically, in the power tool according to the present invention, a pivot shaft support part is provided at the bottom part of the handle grip. The pivot shaft support part is formed with a through-hole extending in a lateral direction of the body. The engaging teeth and resilient member contact parts are provided at respective lateral positions inside the through-hole. The pivot shaft is rotatably supported in the bottom part of the handle grip by extending the pivot shaft through the through-hole from one side to the other side thereof in the lateral direction. The pivot shaft has a generally hollow cylindrically shape open at another end opposite to the one end. The removal prevention means includes a bolt with a head on one end and inserted and screwed to an inner surface of the pivot shaft from the other end of the pivot shaft. The fitting teeth is provided as a part of the pivot shaft located inside the through-hole and meshedly engageable with the engaging teeth. The resilient member is disposed inside the through-hole and has one end in contact with the resilient member contact parts and another end in contact with the head.

With the power tool thus constructed, the light-emitting element is disposed to the free end of the lever that is fixable at a desired pivot angle, and the lighting angle of the light-emitting element can be desirably adjusted. Lighting that is best for the length of the end tool and fastener can therefore be provided, and fasteners can be tightened more easily due to improved visibility.

Furthermore, because the light-emitting element is disposed to the free end of the lever, and the angular position of the lever is held by the engagement of the fitting teeth on the pivot shaft connected integrally with the lever with first engaging teeth or second engaging teeth provided on the handle grip, the projected light will not shake even if vibration is produced in the tool body when working with the power tool, and visibility is thus improved.

Further preferably, in the power tool according to the present invention, the pivot shaft support part includes a first pivot shaft support part and a second pivot shaft support part each having a laterally symmetrical shape and each being formed with a through-hole oriented in the lateral direction of the body. The engaging teeth are provided at the laterally symmetrical locations inside the respective through-holes of the first pivot shaft support part and second pivot shaft support part. The first pivot shaft support part and second pivot shaft support part are located respectively on one side and another side in the lateral direction. The removal prevention means is detachably engaged with the pivot shaft. The engaging teeth of the second pivot shaft support part function as the resilient member contact part when the engaging teeth of the first pivot shaft support part are meshed with the fitting teeth, and the engaging teeth of the first pivot shaft support part function as the resilient member contact part when the engaging teeth of the second pivot shaft support part are meshed with the fitting teeth.

With the power tool thus constructed, the lever installed to one side on the bottom of the handle grip can be removed and installed to the other side on the bottom of the handle grip by removing the removal prevention means from the pivot shaft, removing the pivot shaft from the through-hole on the one side, re-inserting the pivot shaft to the through-hole from the other side, and then screwing and securing the removal prevention means in the pivot shaft. Therefore, because the lever can be installed to the bottom of the handle grip from either the left side or the right side, the power tool can be comfortably used without the lever getting in the way whether the user is left-handed or right-handed.

Furthermore, because the lever is removably installable to the handle grip, The lever can be removed from the handle grip and used as a handheld flashlight.

Further preferably, the power tool according to the present invention also has a vibration damper disposed between the handle grip and the base-end part for suppressing transmission of vibration from the handle grip to the lever.

With this structure, severe vibration transmitting from the handle grip to the lever when using the power tool can be effectively damped by the vibration damper. Continuity failures in the light-emitting element and wiring breaks in the lighting circuit inside the lever can therefore be prevented.

Furthermore, with the power tool according to the present invention, the lever includes an extensible member disposed at a specific position between the base end and the free end, and a rotary joint is disposed at a position closer to the free end and permitting a free end part to be pivotally movable relative to the extensible member.

The extensible member and rotary joint those disposed to the lever make it possible to set the light-emitting element of the light unit closer to the illuminated object and to project light from the best angle, thus making it possible to see the illuminated object clearly.

Yet further preferably, the lever is separated from the handle grip with a predetermined gap therebetween, and the lever functions as a hook for hanging the tool. This construction eliminates the need for a place to set the power tool when working in high places. Furthermore, because the hook and light unit are rendered in a single component, they will not get in the way and are more convenient.

Yet further preferably, the light-emitting element of a power tool according to the present invention is a yellow LED. This increases contrast and enables seeing the illuminated end tool and fastener clearly and plainly. Furthermore, because contrast is high, it is not necessary to increase power consumption and a smaller power supply and circuit can be used. Furthermore, because current consumption is 1/10 or less as large as that of a conventional incandescent flashlight bulb, a small, commercial N size battery can be used, and the power tool can be made small and economical.

Yet further preferably, the power tool according to the present invention also has switch means for switching the light-emitting element on and off, and an off circuit for automatically turning the light-emitting element off at a predetermined time after the light-emitting element turns on. Thus, the power tool prevents depleting the power source when the user forgets to turn the switch off.

In another aspect of the present invention, there is provided a power tool including a motor as a drive power source, a body housing the motor and having an end output unit for chucking an end tool driving a fastener, a handle grip provided integrally with the body, and a light unit disposed to one of the handle grip and the body, and having a light-emitting element for illuminating a fastener located at a distal end of the end tool, the end tool being driven by the motor to tighten the fastener to a workpiece. The light-emitting element comprises a yellow LED.

With the power tool thus constructed, contrast is increased and the illuminated end tool and fastener can be seen clearly and plainly. Furthermore, because contrast is high, it is not necessary to increase power consumption and a smaller power supply and circuit can be used. Furthermore, because current consumption is 1/10 as large as that of a conventional incandescent flashlight bulb, a small, commercial N size battery can be used, and the power tool can be made small and economical.

In still another aspect of the invention, there is provided a power tool including a motor as a drive power source, a body housing the motor and having an end output unit for chucking an end tool driving a fastener, a handle grip provided integrally with the body, and a light unit disposed to one of the handle grip and the body, and having a light-emitting element for illuminating a fastener located at a distal end of the end tool, the end tool being driven by the motor to tighten the fastener to a workpiece. The light unit includes switch means for switching the light-emitting element on and off; and an off circuit for automatically turning the light-emitting element off at a predetermined time after the light-emitting element turns on. The power tool thus constructed prevents depleting the power source when the user forgets to turn the switch off.

In still another aspect of the invention, there is provided a power tool including a motor as a drive power source, a body housing the motor and having an end output unit for chucking an end tool driving a fastener, a handle grip provided integrally with the body, and a light unit disposed to the body and having a light-emitting element for illuminating a fastener located at a distal end of the end tool. The end tool is driven by the motor to tighten the fastener to a workpiece. The body has a generally hollow cylindrical part at a position corresponding to the end output unit. The light unit is positioned at a tip end of the end output unit and is generally ring-shaped around a circumference of the generally hollow cylindrical part. The light unit includes a lens having a ring shape for emitting light in a ring-like manner from the light-emitting element, a power source for driving the light-emitting element, and switch means for switching light-emitting element on/off.

With the power tool thus constructed, light is emitted from a plurality of directions through the lens, shadows of the end tool cast by one light-emitting element are cancelled by another light-emitting element, so that no end tool shadows are generated, the tip of the end tool is rendered very easy to see, and operability is improved.

In still another aspect of the invention, there is provided A power tool including a motor as a drive power source, a body housing the motor and having an end output unit for chucking an end tool driving a fastener, a handle grip provided integrally with the body, and a light unit having a light-emitting element for illuminating a fastener located at a distal end of the end tool, the end tool being driven by the motor to tighten the fastener to a workpiece. A pull trigger is disposed at a top part of the handle grip for starting/stopping driving the end tool. The light unit is disposed immediately above the trigger.

With the power tool thus constructed, the index finger will not strike the light unit when the user extends the finger from the position gripping the handle grip toward the tip of the end tool because the light unit is disposed directly above the trigger. The light unit therefore does not interfere with power tool operation, and usability is improved.

BEST MODE FOR CARRYING OUT THE INVENTION

Figure 1:
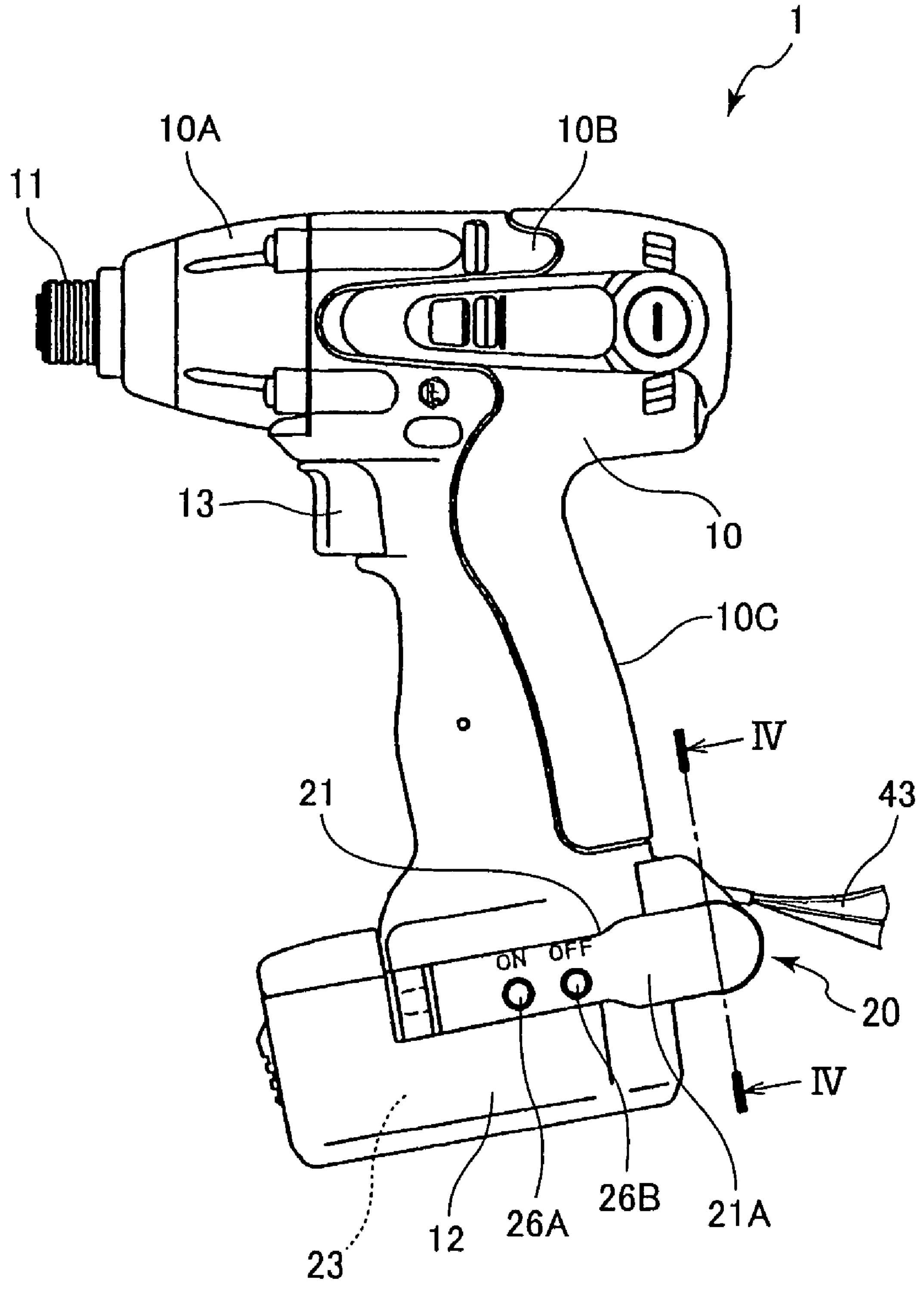
FIG. 1 is a side view of a power tool according to a first embodiment of the present invention.
Figure 11:
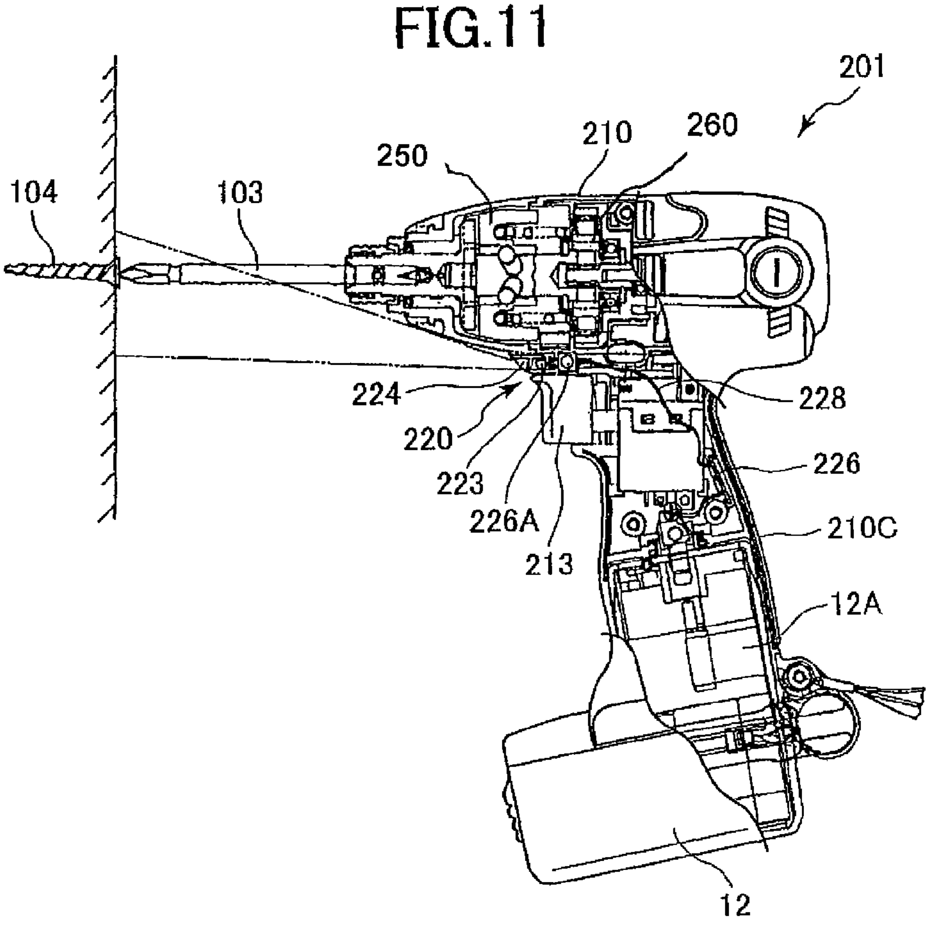
FIG. 11 is a partial cross-sectional view of a power tool according to a third embodiment of the present invention.
Figure 12:
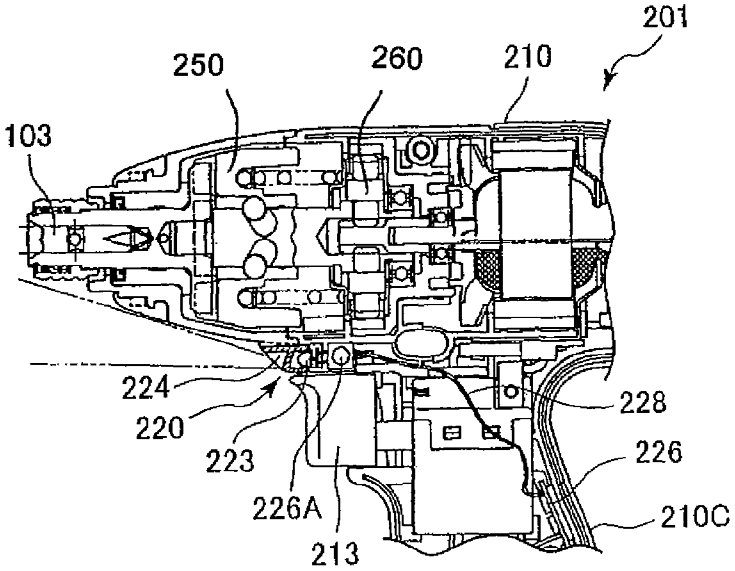
FIG. 12 is a cross-sectional view showing an essential portion of the power tool according to the third embodiment of the present invention.

A power tool 1 according to a first embodiment of the present invention will be described below with reference to FIG. 1 to FIG. 7. As shown in FIG. 1, this power tool 1 is specifically described as an impact driver having a generally T-shaped body 10. This body 10 includes a hammer case 10A forming the front end part of the body 10, and a housing 10B connected to the hammer case 10A and forming the back part of the body 10. A motor not shown functioning as the drive source, and mechanical parts not shown composed of, for example, a speed reduction mechanism for transferring motor torque, are housed inside the housing 10B. The speed reduction mechanism 260, as shown in FIGS. 11 and 12, includes a planetary gear unit not shown and other parts.

Figure 10:
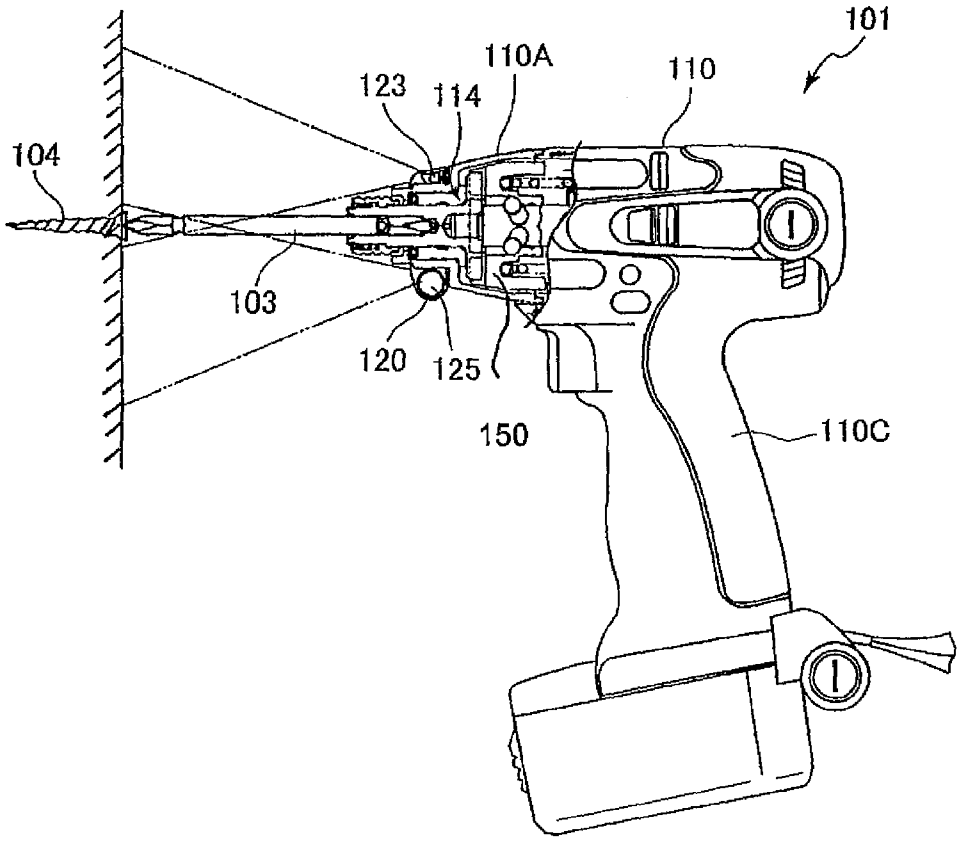
FIG. 10 is a partial cross-section view showing the power tool according to the second embodiment of the present invention.

An end output unit not shown is housed inside the hammer case 10A, and a chuck 11 for holding a tool or bit is disposed to the hammer case 10A. The chuck 11 has a hollow, substantially cylindrical insertion end for inserting therein a shaft-like end tool such as a bit 2, 3 (see FIG. 6 and FIG. 7). One of the tool bit 2, 3 is detachably inserted into the chuck 11. The end output unit not shown has an impact mechanism 150, as shown in FIGS. 8 and 10 and 250 as shown in FIGS. 11 and 12 for converting the rotary force of the motor not shown to an impact force and driving the bit 2, 3, and is drivingly linked to the motor not shown. When the motor not shown is driven for driving the bit 2, 3, the screw or other fastener 4, 5 (FIG. 6, FIG. 7) is tightened to the workpiece 6 or loosened therefrom.

A handle grip 10C extends from a lower portion of the body 10. The handle grip 10C is integrally with the body 10, and a battery pack 12 internally housing a battery not shown is disposed to the bottom of the handle grip 10C. A pull trigger 13 for starting and stopping the motor is disposed to the top part of the handle grip 10C. Contacts not shown and connection terminals not shown for electrically connecting the motor not shown inside the housing 10B to the battery not shown inside the battery pack 12 are also disposed inside the handle grip 10C. The battery pack 12 is detachably attached to the handle grip 10C, and the internal battery not shown supplies power to the motor not shown.

Figure 2:
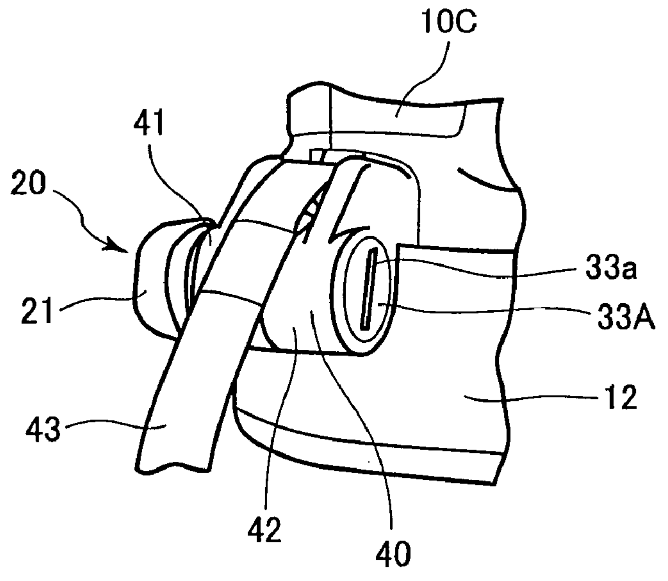
FIG. 2 is a partial rear view showing an essential part where a light unit is supported on a body of a power tool according to the first embodiment of the present invention.
Figure 3:
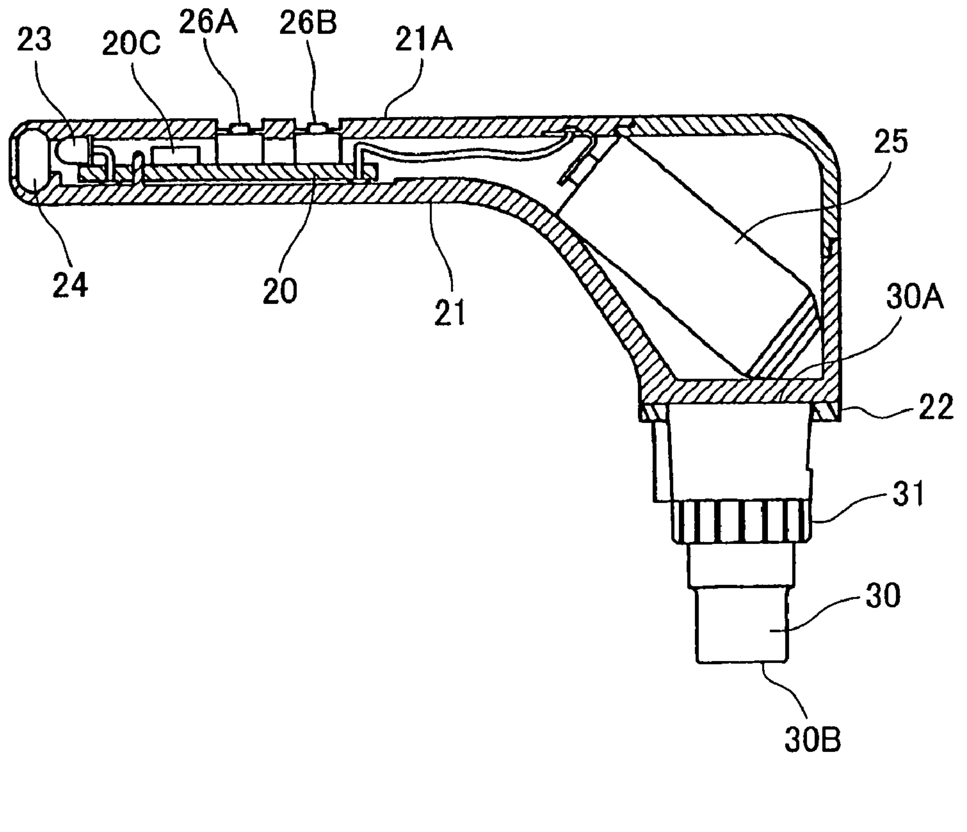
FIG. 3 is a cross-sectional view showing a lever and a pivot shaft those constituting the light unit of the power tool according to the first embodiment of the present invention.

A light unit 20 is disposed to a position at the bottom of the handle grip 10C and immediately above the battery pack 12. As shown in FIG. 2 or FIG. 3, the light unit 20 includes a lever 21 and a pivot shaft 30 and a pivot shaft support part 40. The lever 21 is provided integrally with one end 30A of the pivot shaft 30 having substantially cylindrical shape. The pivot shaft support part 40 is provided at a lower portion of the handle grip 10C for supporting the pivot shaft 30. More specifically, the pivot shaft 30 is supported by the support part 40 rotably about its axis and axially movable along its axis. The lever 21 has a base end connected to the pivot shaft 30 and has a free end. The base end of the lever 21 is connected to the pivot shaft 30 so as to cover an opening in the one end 30A of the substantially cylindrical pivot shaft 30. The lever 21 can therefore pivotally moved in conjunction with the pivot shaft 30 about the axis of the pivot shaft 30, and can move along the axis of the pivot shaft 30. The pivot shaft 30 has another end 30B which is an open end.

Figure 4:
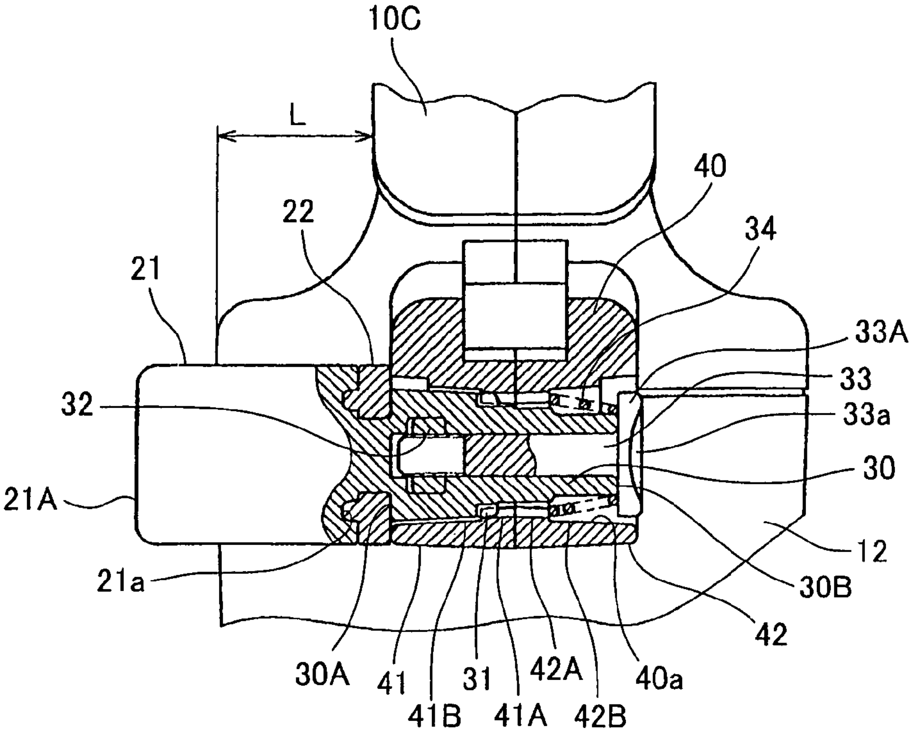
FIG. 4 is a cross-section view of the major components showing an essential part where the light unit is supported on the body of the power tool according to the first embodiment of the present invention.

As shown in FIG. 4, the pivot shaft support part 40 is composed of a first pivot shaft support part 41 and a second pivot shaft support part 42 shaped symmetrically sideways the body 10. A through-hole 40*a* passes through these parts 41 and 42. The axis of this through-hole 40*a* is also oriented sideways to the body 10, that is, in the right-to-left direction as seen in FIG. 4. The pivot shaft support part 40 is provided integrally with the handle grip 10C, and the pivot shaft 30 is disposed rotatably about its axis to the handle grip 10C and movable in the axial direction while the pivot shaft 30 is extending through the through-hole 40*a*.

With the power tool 1 shown in FIG. 1 to FIG. 7 the pivot shaft 30 passes from the left to the right side of the body 10 when viewed from the back side of the power tool 1, that is, from the left to the right side in FIG. 4, such that the one end 30A of the pivot shaft 30 connected to the lever 21 is positioned on the left side and the other end 30B is positioned on the right side of the body 10 when seen from the back of the power tool 1. A hand strap 43 (see FIG. 2) is disposed at a connecting position of the pivot shaft support part 40 to the handle grip 10C.

First engaging teeth 41A and second engaging teeth 42A are formed in the part of and at the through-hole 40*a* of the first pivot shaft support part 41 and second pivot shaft support part 42. First engaging teeth 41A and second engaging teeth 42A are disposed at symmetrical positions sideways to the body 10 substantially in the middle in the axial direction of the through-hole 40*a*. First engaging teeth 41A and second engaging teeth 42A protrude radially inwardly of the through-hole 40*a*. Thus, a reduced inner diameter part is provided in the through-hole 40*a* at positions corresponding to the locations of the first engaging teeth 41A and second engaging teeth 42A. The ends of the first engaging teeth 41A and second engaging teeth 42A in the axial direction of the through-hole 40*a* respectively form first resilient member contact part 41B and second resilient member contact part 42B, respectively. The distance between first resilient member contact part 41B and second resilient member contact part 42B is approximately 10 mm.

As shown in FIG. 4, fitting teeth 31 are provided to the pivot shaft 30 at a position opposite to the first engaging teeth 41A. The fitting teeth 31 are provided in a circumferential direction of the pivot shaft 30 at a position offset towards the one end 30A from the approximate middle in the axial direction of the pivot shaft 30 so that the fitting teeth 31 is meshedly engagable with the first engaging teeth 41A when positioned as shown in FIG. 1 to FIG. 7, that is, when the power tool 1 is used with the one end 30A of pivot shaft 30 positioned to the left side of the handle grip 10C as shown in FIG. 4.

More specifically, when the pivot shaft 30 is inserted fully to the through-hole 40*a* as shown in FIG. 4, the fitting teeth 31 are meshedly engaged with the first engaging teeth 41A. When the user pulls the lever 21 approximately 5 mm to the left in FIG. 4 and the pivot shaft 30 thus moves in the same direction, engagement of the fitting teeth 31 with first engaging teeth 41A is released.

When the fitting teeth 31 are meshed with the first engaging teeth 41A, the rotation of the pivot shaft 30 about its axis is prevented. As a result, pivotal movement of the lever 21 formed integrally with the pivot shaft 30 is prevented. On the other hand, rotation of the pivot shaft 30 is not prevented when the fitting teeth 31 are disengaged from the first engaging teeth 41A. Therefore, the pivot shaft 30 can be rotated about its axis, and the lever 21 integrally with the pivot shaft 30 can be pivotally moved about the axis.

A nut 32 (FIG. 4) is located on the inside surface of the substantially tubular pivot shaft 30 at a position near the one end 30A. An inner diameter of the nut 32 is equal to an inner diameter of a major part of the pivot shaft 30 where the nut 32 is not disposed. A single bolt 33 is inserted along the inner peripheral surface of the nut 32 and the inner peripheral surface of the major part of the pivot shaft 30. The bolt 33 is fixed to the pivot shaft 30 by threadingly engaging the bolt 33 with the nut 32. The bolt 33 is detachable from the pivot shaft 30. A coin slot 33*a* into which a coin can be fit is formed in a head 33A of the bolt 33. The bolt 33 can be screwed into the nut 32 of the pivot shaft 30, or the bolt 33 can be unscrewed from and removed from the pivot shaft 30 by inserting a coin to the coin slot 33*a* and turning the bolt 33. The bolt 33 is inserted from the open end at the other end of the pivot shaft 30, and is screwed into the nut 32, and fastened to the pivot shaft 30 before the power tool 1 is used.

A resilient member 34 such as a spring is disposed inside the through-hole 40*a* between the head 33A of bolt 33 and second engaging teeth 42A. One end of the resilient member 34 is in abutment with the second resilient member contact part 42B of the second engaging teeth 42A, and the other end of the resilient member 34 is in abutment with the head 33A of bolt 33. The resilient member 34 is a compression spring compressed between the head 33A of bolt 33 and the second resilient member contact part 42B. The resilient member 34 therefore urges the head 33A of bolt 33 integrally with the pivot shaft 30 to the right as seen in FIG. 4, that is, in the direction for allowing the fitting teeth 31 to be engaged with the first engaging teeth 41A.

When the lever 21 is moved resisting the urging force of the resilient member 34 in the direction away from the handle grip 10C, that is, is moved to the left in FIG. 4, in order to disengage the fitting teeth 31 from the first engaging teeth 41A, the pivot shaft 30 also moves in the same direction. As the lever 21 is moved further in this direction, the resilient member 34 becomes completely compressed and cannot be further compressed. Because the head 33A of the bolt 33 contacts the other end of the resilient member 34, the bolt 33 and pivot shaft 30 which moves in unison with the bolt 33, reach a point where they cannot move further to the left in FIG. 4. Therefore, the pivot shaft 30 is prevented from dropping out of the through-hole 40*a*. The bolt 33 thus functions as a retainer preventing separation of the pivot shaft 30 from the through-hole 40*a*.

Because the pivot shaft support part 40 is composed of first pivot shaft support part 41 and second pivot shaft support part 42 symmetrical therewith in the lateral direction of the body 10, and first engaging teeth 41A and second engaging teeth 42A are disposed at symmetrical positions sideways to the body 10, the lever 21 can be fit into the handle grip 10C from the left side as shown in FIG. 4, or from the right side of the handle grip 10C rather than the left side as may be needed.

More specifically, the bolt 33 can be removed from pivot shaft 30, and the pivot shaft 30 is then removed from through-hole 40*a*. The pivot shaft 30 is then inserted from the right side in FIG. 4 to the through-hole 40*a*, the resilient member 34 is fit to the end of the pivot shaft 30, and the one end of the resilient member 34 is set against the first resilient member contact part 41B of first engaging teeth 41A. The bolt 33 is then screwed into the nut 32 of pivot shaft 30 and fixed to the pivot shaft 30 so that the other end of resilient member 34 contacts the head 33A. The lever 21 is thereby installed at the right side of the handle grip 10C as seen in FIG. 4. As a result, the lever 21 can be installed at a position for avoiding interference with operation of the power tool 1 regardless of whether the user is right-handed or left-handed.

In this case, when the first engaging teeth 41A of first pivot shaft support part 41 is in meshing engagement with the fitting teeth 31, the other end of second engaging teeth 42A functions as the resilient member contact part. Furthermore, when the second engaging teeth 42A of second pivot shaft support part 42 is in meshing engagement with the fitting teeth 31, the end of first engaging teeth 41A functions as the resilient member contact part.

It should be noted that a combination of the pivot shaft 30, fitting teeth 31, first pivot shaft support part 41, second pivot shaft support part 42, first engaging teeth 41A, second engaging teeth 42A, resilient member 34, first resilient member contact part 41B, second resilient member contact part 42B, and bolt 33 functions as lighting angle adjusting and holding means.

A recessed channel 21*a* is formed encircling the pivot shaft 30 at the base end of the lever 21, which is connected to the pivot shaft 30 and is opposed to the first pivot shaft support part 41. An annular washer 22 made of rubber approximately 2 mm thick is fit into this channel 21*a*. The washer 22 therefore encircles the pivot shaft 30 at a position on the end of the lever 21 connected to the pivot shaft 30. This washer 22 functions as a vibration damper.

The open end of the through-hole 40*a* in the first pivot shaft support part 41 is configured to contact the washer 22 when no force is applied to the lever 21 and the lever 21 has moved to the right-most side in FIG. 4 due to the urging force of the resilient member 34. Harsh vibration transmitted to the handle grip 10C when the power tool 1 is used is therefore absorbed by this washer 22. Thus, the washer 22 efficiently prevents the vibration from being transmitted to the lever 21. As a result, interruptions in wiring members and conductivity failure in the light-emitting element 23 of a lighting circuit 27 disposed inside the lever 21 as described below can be prevented.

As shown in FIG. 3, the lever 21 has a thick base end connected to the pivot shaft 30. The lever 21 becomes gradually smaller towards the free end thereof, and has a constant thickness from a predetermined position. Therefore, the elongated portion of the lever 21 is spaced away from the handle grip 10C with a gap L of approximately 20 mm as shown in FIG. 4. Note that FIG. 4 shows the rear view of the power tool 1, and the elongated portion of the lever 21 therefore extends in the direction perpendicular to the drawing sheet.

As shown in FIG. 3, the lever 21 houses therein a light-emitting element 23, which is composed of an LED emitting yellow light, a lens 24 made of transparent plastic plate, and a power source 25 composed of an N size battery. The light-emitting element 23 is disposed in the free end of the lever 21 for emitting light in the direction from the base end to the free end of the lever 21. The lens 24 covers the light-emitting element 23 and protects the light-emitting element 23. The power source 25 is housed inside the base end of the lever 21 connected to the pivot shaft 30, and is electrically connected to the light-emitting element 23.

A push-button ON switch 26A for turning light emission from the light-emitting element 23 on, and a push-button OFF switch 26B for turning the light-emitting element 23 off, are disposed on the outside surface 21A of the lever 21. ON switch 26A, OFF switch 26B, and light-emitting element 23 are mounted on a circuit board 26, rendering a switching means.

Figure 5:
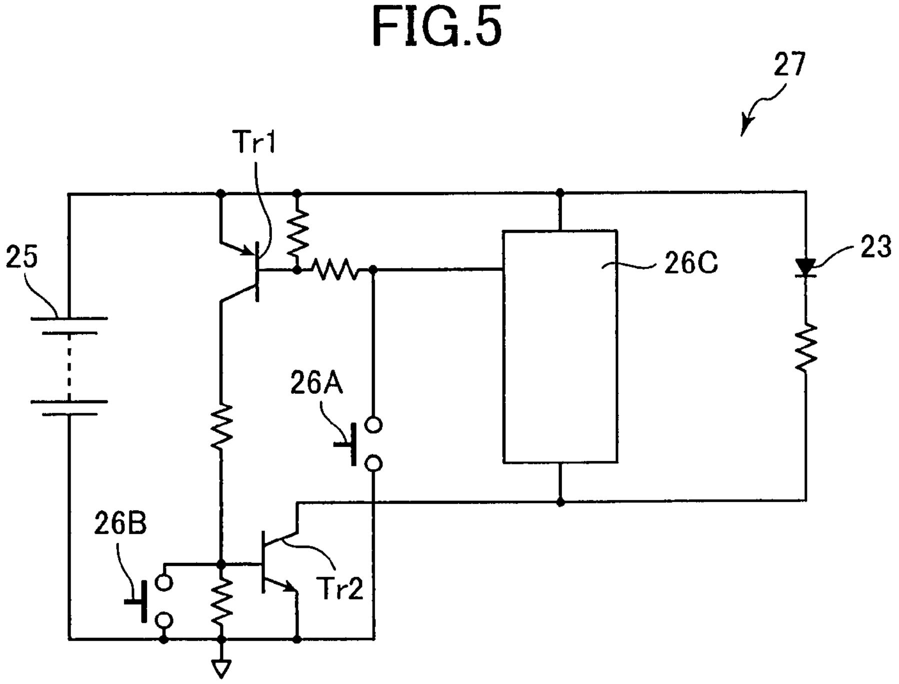
FIG. 5 is a circuit diagram showing a lighting circuit of the light unit of the power tool according to the first embodiment of the present invention.

A semiconductor timer circuit 26C is also mounted on the circuit board 26. The semiconductor timer circuit 26C is adapted for automatically turning the light-emitting element 23 off 30 seconds after the light-emitting element 23 is turned on by means of the ON switch 26A. The power source 25, light-emitting element 23, ON switch 26A, OFF switch 26B, and timer circuit 26C are connected to each other and form a lighting circuit 27 as shown in FIG. 5. The lighting circuit 27 also has transistors Tr1, Tr2, and a plurality of resistors. Because the circuit board 26 and timer circuit 26C are relatively thin, they are disposed inside the lever 21 at a position near the free end, and the relatively thick power source 25 is disposed inside the base part of the lever 21. The timer circuit 26C functions as an off circuit.

When the user presses the ON switch 26A of the lighting circuit 27 shown in FIG. 5, base current is supplied to Tr1, and when Tr1 turns on Tr2 also turns on. Current supply to the timer circuit 26C and light-emitting element 23 starts when Tr2 goes on. The ON switch 26A and OFF switch 26B are both push-button switches composed of momentary switches, and when the user presses and then releases the switch, the contacts open.

Because the timer circuit 26C sets output Vt to L level soon after current supply starts, the timer circuit 26C continues to hold Tr1 and Tr2 on even after the user releases ON switch 26A, and thus self-holds current supply to the light-emitting element 23 and timer circuit 26C.

When the OFF switch 26B is pressed to turn the light-emitting element 23 off, the base-emitter voltage of Tr2 goes to zero, so that Tr2 goes off, and the light-emitting element 23 turns off. In addition, if the user forgets to turn the switch off, timer circuit 26C sets output Vt to H level three minutes after light-emitting element 23 turns on, thereby stopping current supply to the base of Tr1 for turning Tr1 and Tr2 off. When Tr2 goes off, base current supply to Tr2 also stops, so that the light-emitting element 23 turns off automatically. Depletion of the power source 25 can therefore be prevented even if the user forgets to turn the switch off.

By using a yellow LED instead of a white LED for the light-emitting element 23, contrast can be improved and the illuminated bit 2, 3 and fasteners 4, 5 can be seen clearly. Furthermore, because contrast is high, it is not necessary to increase electrical consumption, and the size of the power source 25 and lighting circuit 27 can be reduced. Furthermore, because current consumption is 1/10 or less as large as a normal incandescent flashlight bulb, a small battery, such as a standard N size battery, can be used, and the power tool 1 can be made small and economical.

Furthermore, because the light-emitting element 23 is provided at the free end of the lever 21 that can be held stationary at a desired angle, so that the emission angle of the light-emitting element 23 can be freely adjusted, lighting can be optimized for the bit 2, 3 and fasteners 4, 5, and the fasteners 4, 5 can be comfortably fastened.

Furthermore, because the light-emitting element 23 is disposed in the free end of the lever 21, and the pivot position of the lever 21 is held by engagement of the fitting teeth 31 of pivot shaft 30 connected integrally to lever 21 with the first engaging teeth 41A or second engaging teeth 42A disposed in the handle grip 10C, vibration in the body 10 when using the power tool 1 will not cause the emitted light to vibrate thereby facilitating observation to the target.

Furthermore, if the lighting by the light unit 20 is not required, the lever 21 is returned to the original resting position shown in FIG. 1. When the lever 21 is returned to the resting position, the lever 21 cannot interfere with gripping the handle, and the power tool 1 can be used easily.

Figure 6:
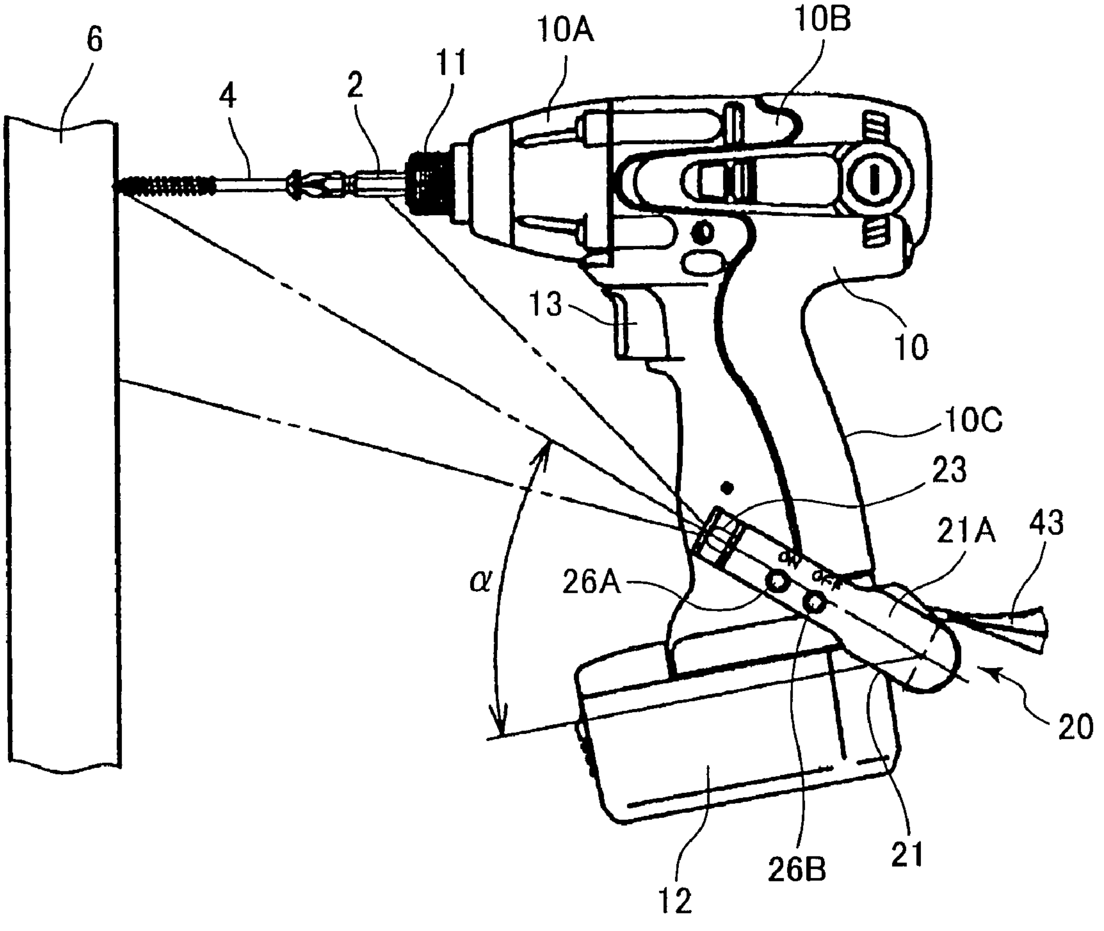
FIG. 6 is a side view showing the power tool according to the first embodiment of the present invention in which a relatively short bit is held by a chuck.

When a relatively short bit 2 is chucked in the power tool 1 to work with a relatively short fastener 4 as shown in FIG. 6, the power tool 1 is used with the pivot angle α of the lever 21 increased to bring the illuminated area closer.

More specifically, the lever 21 in the initial pivot position shown in FIG. 1 is pulled away from the bottom of the handle grip 10C (that is, in the direction lifting off of the page in FIG. 6) approximately 5 mm and turned to a pivot angle α of approximately 40°, and the lever 21 is then released. The lever 21 is thus fixed in the position shown in FIG. 6 and cannot be pivotally moved any more. The ON switch 26A is then pressed so that the light-emitting element 23 starts emitting in the direction of the fastener 4, and the trigger 13 is pulled to drive the bit 2 and tighten the fastener 4.

Figure 7:
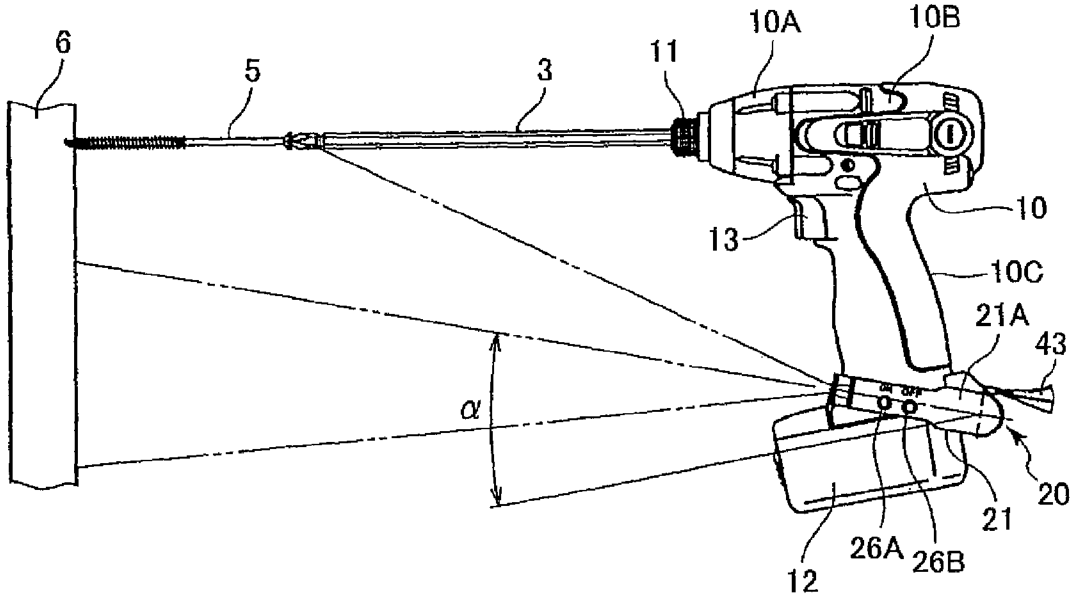
FIG. 7 is a side view showing the power tool according to the first embodiment of the present invention in which a relatively long bit is held by the chuck.
Figure 8:
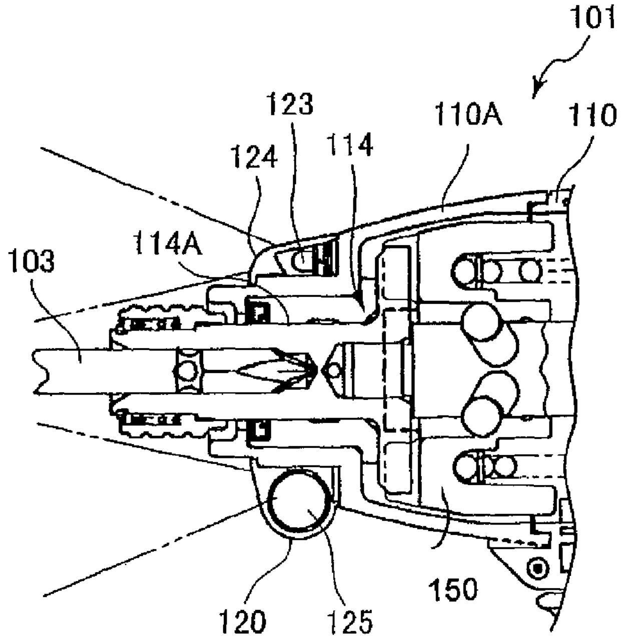
FIG. 8 is a cross-sectional view showing an essential portion of a power tool according to a second embodiment of the present invention.

When a relatively long bit 3 is chucked in the power tool 1 to fasten a relatively long fastener 5 as shown in FIG. 7, the pivot angle α of the lever 21 is reduced to illuminate a position farther away when using the power tool 1.

More specifically, the lever 21 in the initial rotary position shown in FIG. 1 is pulled away from the bottom of the handle grip 10C (that is, in the direction lifting off of the page in FIG. 7) approximately 5 mm and turned to the pivot angle α of approximately 20°, and the lever 21 is then released. The lever 21 is thus fixed in the position shown in FIG. 7 and cannot be pivoted any more. The ON switch 26A is then pressed so that the light-emitting element 23 starts emitting in the direction of the fastener 5, and the trigger 13 is pulled to drive the bit 3 and tighten the fastener 5.

To remove the lever 21 from the left side of the handle grip 10C as seen in FIG. 4 and install it from the right side, a coin not shown is first fit into the coin slot 33*a* to rotate the bolt 33 about its axis relative to the pivot shaft 30 and remove the bolt 33 from the pivot shaft 30. Next, the pivot shaft 30 is removed from the through-hole 40*a* and then reinserted to the through-hole 40*a* from the right side. Then, the resilient member 34 is fit to the end of the pivot shaft 30, and one end of the resilient member 34 is seated against the first resilient member contact part 41B of first engaging teeth 41A.

Next, the coin not shown is fit into the coin slot 33*a* to rotate the bolt 33 about its axis into the pivot shaft 30 while threadingly engaging the bolt 33 with the nut 32, thereby fixing the bolt 33 in the pivot shaft 30. With this procedure, the lever 21 is reinstalled to the handle grip 10C from the right side in FIG. 4.

Furthermore, because the lever 21 is removably installed to the handle grip 10C, the lever 21 can be removed from the handle grip 10C and used as a handheld flashlight. Furthermore, because the lever 21 is thick at the base end connected to the pivot shaft 30 and becomes gradually thinner towards the free end, so that the elongated portion of the lever 21 is spaced away from the handle grip 10C with an appropriate gap L therebetween (FIG. 4). Thus, the lever 21 can also function as a hook for hanging on the worker's belt or ladder, and an installation space to rest the power tool 1 when working in high places can be eliminated. Furthermore, because this hook and light unit 20 are rendered as one piece, they are convenient and do not get in the way.

Furthermore, because the circuit board 26 and timer circuit 26C are disposed near the free end of the lever 21 and the power source 25 is disposed inside the base end of the lever 21, the part near the free end of the lever 21 imparted with the functionality of a hook can be rendered thin and small.

Figure 9:
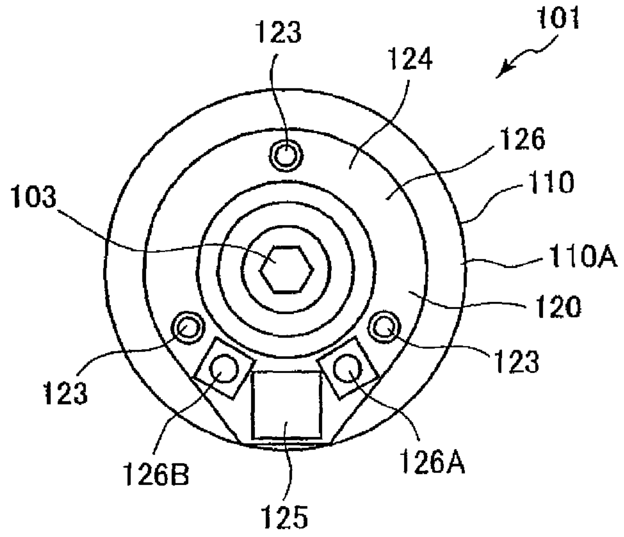
FIG. 9 is a front view showing the power tool according to the second embodiment of the present invention.

A power tool according to a second embodiment of the present invention is described next with reference to FIG. 8 to FIG. 10. A power tool 101 according to this second embodiment is different from the power tool 1 of the first embodiment in that a light unit 120 is not provided at the bottom part of a handle grip 110C, but is positioned on an outside of a hammer case 110A at a distal end section 114A of an end output part 114.

The end output part 114 forms a part of the body 110, and houses therein an impact mechanism 150 for converting torque from a motor not shown to an impact force and driving a bit 103. The end output part 114 has the distal end section 114A provided with the light unit 120.

The light unit 120 is almost ring-shaped following the circumference of the distal end section 114A of the substantially cylindrical end output part 114, and encircles the distal end section 114A. The light unit 120 has a flat ring like substrate 126 (FIG. 9) substantially identical in shape to a body of the light unit 120 and disposed coaxially with the body of the light unit 120. The light unit 120 also has three light-emitting elements 123 (FIG. 9), an ON switch 126A and OFF switch 126B, a timer circuit not shown, and a power source 125, each of which is rendered on the flat ring like substrate 126.

The light-emitting elements 123 are disposed at equal intervals around the distal end section 114A so that they are mutually offset 120° around the axis of the bit 103, and oriented to emit light to the front of the power tool 101. The power source 125, ON switch 126A, and OFF switch 126B are also disposed on the same circle as the light-emitting elements 123. These are all covered by a transparent plastic lens 124. Further, the second embodiment provides the arrangement the same as that of the first embodiment in that when using the power tool 101 the user presses ON switch 126A to turn the light-emitting elements 123 on and illuminate the fastener, and the light-emitting elements 123 turns off automatically approximately three minutes after the light turns on.

Light from a single light-emitting element 23 such as used in the power tool 1 according to the first embodiment casts a shadow from the bit 2, 3 on the workpiece 6 and on a cruciform groove at a head of the fastener 4 or 5, and makes it difficult to see the cruciform groove. However, because the multiple light-emitting elements 123 emit light surrounding the bit 103 with a power tool 101 according to the second embodiment of the invention, any shadow from the bit 103 cast by one light-emitting element 123 is cancelled by light from another light-emitting element 123. As a result, a shadow of the bit 103 is not cast, it is very easy to see the end of the bit 103, thereby enhancing workability.

A power tool 201 according to a third embodiment of the present invention is described next with reference to FIGS. 11 and 12. A power tool 201 according to this third embodiment differs from the power tool 1 of the first embodiment in that a Light unit 220 is disposed at a position directly above a trigger 213 rather than at the bottom of a handle grip 210C. Thus, as shown, the light unit 220 is disposed within a protective space surrounded by the handle grip 210C and the body 210. The third embodiment also differs from the power tool 1 of the first embodiment in that the light unit 220 is provided with a light-emitting element 223, ON switch 226A, and OFF switch 226B, but is not provided with a power source for exclusively driving the light-emitting element 223, a timer circuit, nor a lighting circuit. The power tool includes an impact mechanism 250 and a speed reduction mechanism 260.

The light unit 220 is disposed immediately above the trigger 213, and has one light-emitting element 223 oriented to the front of a body 210. An ON switch 226A and OFF switch not shown are located close behind the light-emitting element 223. The front of the light-emitting element 223 is covered by a transparent lens 224. The light-emitting element 223, ON switch 226A, and OFF switch are connected to a circuit board 226 by a cord 228. The circuit board 226 is located inside the handle grip 210C and in confrontation with the back of the handle grip 210C, and a lighting circuit not shown including a timer circuit not shown is mounted on the circuit board 226. A power supply for exclusively driving the light-emitting element 223 is not disposed to the circuit board. The circuit board 226 is electrically connected to the battery 12A (FIG. 11), and the light-emitting element 223 is powered by current from the battery 12A.

When using the power tool 201, the bit 103 is driven and the light-emitting element 223 turns on when the user pulls the trigger 213, so that the fastener 104 is illuminated. When the user extends the index finger toward the front of the bit 103 from the position gripping the handle grip 210C, the finger will not touch the light unit 220 because the light unit 220 is located directly above the trigger 213. The light unit 220 thus does not interfere with operation of the trigger 213, and operability to the power tool 201 can be improved.

Furthermore, the light unit 220 does not project outside from the body 210 or battery pack 12, and the light unit 220 does not contact the neighboring or opposing member or get in the way even when using the power tool 201 in a confined location.

Furthermore, because the battery 12A for driving the power tool 201 is also used as the power source for the light-emitting element 223, the power tool 201 can be has a simple construction and produced at low cost. Yet further, wiring inside the body 210 can be simplified and a layout can be made compact.

A power tool according to a fourth embodiment of the present invention is described next with reference to FIG. 13. A power tool 301 according to this fourth embodiment differs from the power tool 1 of the first embodiment in that an extensible member 321B and rotary joint 321C are disposed as parts of a lever 321. Note that for descriptive purposes, a stretched state of the extensible member 321B is shown by a solid line in FIG. 13, and a shrinking state thereof is shown by a dotted line in FIG. 13.

Figure 13:
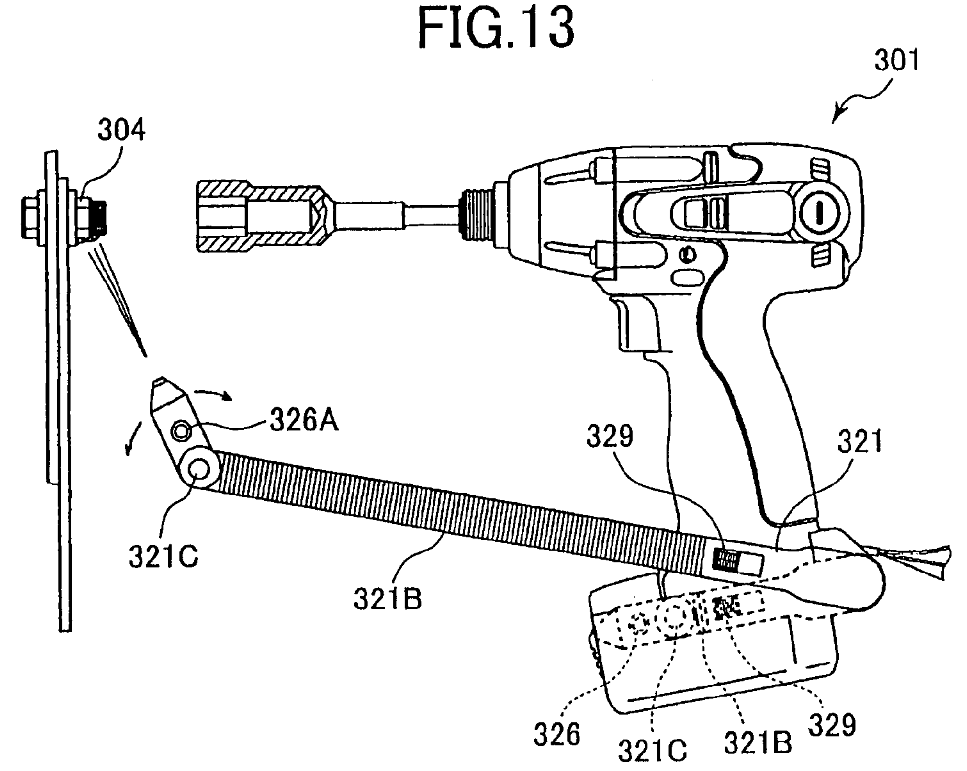
FIG. 13 is a side view of a power tool according to a fourth embodiment of the present invention.
Figure 14:
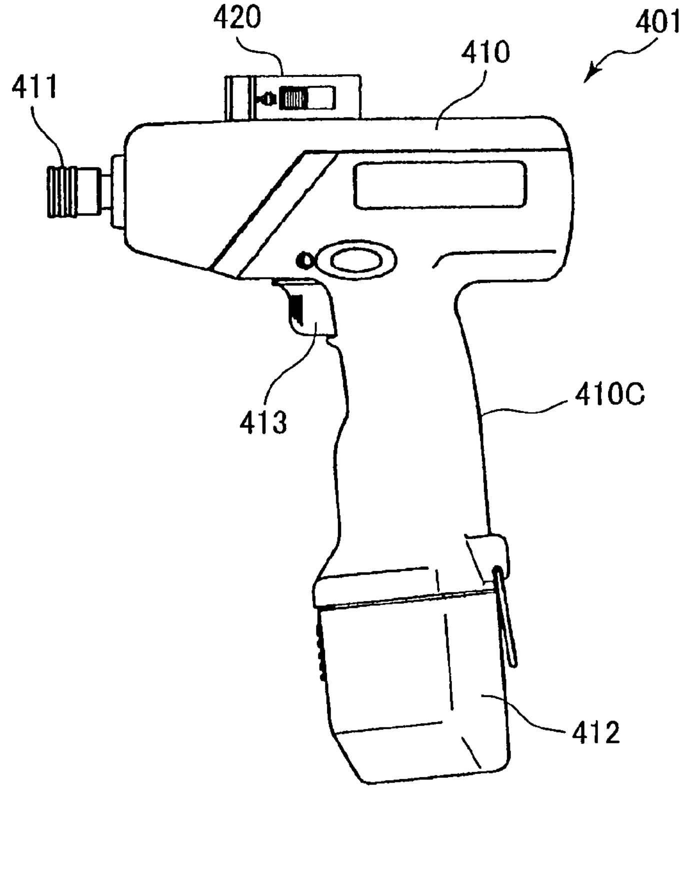
FIG. 14 is a side view showing a conventional power tool.
Figure 15:
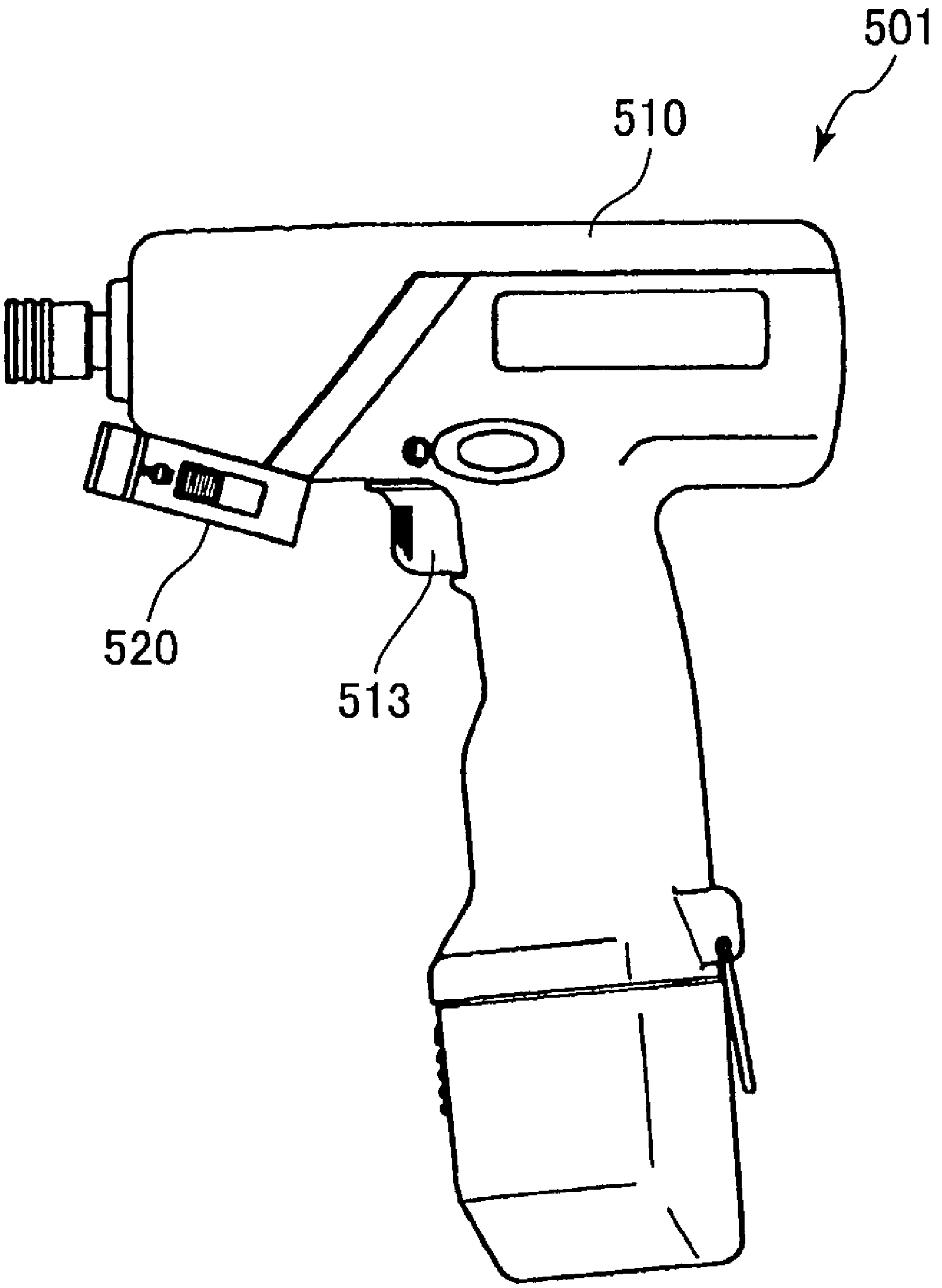
FIG. 15 is a side view showing another conventional power tool.

More specifically, as shown in FIG. 13, the extensible member 321B is disposed in approximately the middle of the lever 321 between the base part and free end part thereof. An extension/retraction switch 329 is also disposed toward the base of the lever 321 from the extensible member 321B. The extensible member 321B is configured to extend and retract according to the operation of the extension/retraction switch 329.

The rotary joint 321C is disposed on the free end side of the lever 321 at one end of the extensible member 321B. A configuration such as the lighting angle adjusting and holding means of the first embodiment is used as the rotary joint 321C, enabling the free end to be pivotally movable and be held at a specific angle relative to the extensible member 321B. An ON switch 326A and OFF switch not shown are located on the free end part of the lever 321.

Because an extensible member 321B and rotary joint 321C are disposed in the lever 321, the light-emitting element not shown of the light unit 320 can be positioned more closely to the illuminated object and can emit light from the best angle, thereby making it easier to see the illuminated object.

In the power tool 301 according to a fourth embodiment of the invention, a spray nozzle for applying a coating can be disposed in place of the light-emitting element. In this case, a spray button is disposed instead of ON switch 326A. When spraying a coating, the object to be coated, such as a bolt 304, can therefore be accurately and easily sprayed by turning the spray button on after positioning the spray sprayed by turning the spray button on after positioning the spray nozzle close to the object to be coated.

When tightening bolts 304, for example, on a building site, it is difficult to visually determine whether the bolt 304 has been tightened. However, by spraying a coating on the bolt 304 or other fastener immediately after tightening, fasteners that have already been tightened can be recognized at a glance, and forgetting to tighten fasteners can be prevented.

A power tool according to the present invention shall not be limited to the embodiments described above, and can be modified and improved in various ways without departing from the scope of the accompanying claims. For example, the motor of the power tools in the above-described embodiments is driven by electrical power, but a pneumatic motor can be used instead of the electric motor.

Furthermore, a dry cell is used as the power source for the light unit in the first, second, and fourth embodiments above, but a rechargeable storage battery can be used instead.

Furthermore, the power tool of the second embodiment has three light-emitting elements and a transparent lens. Instead of this arrangement, one light-emitting element and a single donut-shaped lens can be used. The lens could be a frosted glass lens, or is formed with a fine diffraction pattern. Alternatively, luminescent paint can be impregnated in the lens. Thus, entire donut shaped lens can be lighted-up by a single light-emitting element.

INDUSTRIAL APPLICABILITY

As described above, the present invention can be widely used for tightening and loosening fasteners such as screws and bolts in the building site.

The invention claimed is:

1. A power tool comprising:

a motor as a drive power source, a body housing the motor and having an end output unit having a structure which chucks an end tool which drives a fastener;

a handle grip provided integrally with the body and having a pull trigger, the handle grip extending generally perpendicular to the body so as to delimit a protective space surrounded by a combination of the handle grip and the body; and a light unit having a light-emitting element which illuminates the fastener located at a distal end of the end tool driven by the motor to tighten the fastener to a workpiece;

the pull trigger being disposed at a top part of the handle grip for starting/stopping driving of the end tool, the light unit being disposed within the protective space and at a position below the body and directly above the trigger; and a transparent lens is disposed in front of the light unit.

2. The power tool as claimed in claim 1, wherein the handle grip extends in a direction transverse to an elongated direction of the body housing the motor, the end output unit extending in the elongated extension direction of the body.

3. The power tool as claimed in claim 1, wherein the light-emitting element is accommodated in the body.

4. The power tool as claimed in claim 1, wherein the light-emitting element is fixed to the body.

5. A power tool comprising:

a motor as a drive power source;

a body housing the motor and having an end output unit for chucking an end tool, the body including a hammer case and a housing for the motor, the hammer case housing an impact mechanism, and the housing being fixedly-connected with the hammer case, the end tool being assembled at a front portion of the end output unit;

a handle grip connected with the body, the handle grip extending generally perpendicular to the body so as to provide a protective space surrounded by the handle grip and the body;

a light unit having at least one light-emitting element for illuminating a periphery of the end tool;

wherein a pull trigger is disposed at a top part of the handle grip for starting/stopping driving of the end tool, the at least one light-emitting element of the light unit disposed proximate to the protective space at a position proximate to the pull trigger, and a transparent lens is disposed in front of the light unit;

wherein the at least one light-emitting element of the light unit is fixed inside the body; and wherein the at least one light-emitting element and the transparent lens are positioned below the hammer case.

6. A power tool comprising:

a motor as a drive power source;

a body housing the motor and having an end output unit for chucking an end tool, the body including a housing for the motor, the end tool being assembled at a front portion of the end output unit;

a speed reduction mechanism housed inside of the body;

a handle grip connected with the body, the handle grip extending generally perpendicular to the body so as to provide a protective space surrounded by the handle grip and the body;

a light unit having at least one light-emitting element for illuminating a periphery of the end tool;

wherein a pull trigger is disposed at a top part of the handle grip for starting/stopping driving of the end tool, the at least one light-emitting element of the light unit being disposed proximate to the protective space at a position proximate to the pull trigger and fixed inside the body, and a transparent lens is disposed in front of the light unit, and wherein the at least one light-emitting element and the transparent lens are positioned below the body.

7. A power tool comprising;

a motor;

a body accommodating the motor;

a power transmitting portion connected to the motor;

an output unit supporting an end tool and connected to the power transmitting portion;

a flat ring-shaped substrate positioned at a front side of the body, the ring-shaped substrate being formed with a first through-hole; and a plurality of light emitting elements provided at a front side of the ring-shaped substrate and positioned rearward of a front end of the body, the output unit extending through the first through-hole and movable with respect to the first through-hole.

8. The power tool as claimed in claim 7, wherein the power transmission portion comprises an impact mechanism; and wherein the body comprises a hammer case accommodating the impact mechanism and extending through the first through-hole.

9. The power tool as claimed in claim 7, further comprising:

a trigger provided at the body for energizing the motor; and a switch provided separately from the trigger for turning on/off the light emitting elements, the switch being provided at the body at a position frontward of the motor.

10. The power tool as claimed in claim 7, further comprising a transparent lens positioned frontward of the ring-shaped substrate and connected to the body, the lens being formed with a second through-hole; and wherein the output unit extends through the second through-hole, and is movable with respect to the second through-hole.

11. The power tool as claimed in claim 7, wherein the body has a front portion formed with a stepped portion at which the ring-shaped substrate is positioned.

12. The power tool as claimed in claim 10, wherein the transparent lens is positioned rearward of a front end of the body.

13. A power tool comprising:

a motor;

a housing accommodating therein the motor and having a front portion;

a handle extending downward from the housing and having an upper portion;

a power transmitting portion connected to the motor;

a case fixed to the front portion of the housing and accommodating therein the power transmitting portion, the case having a front portion;

a trigger provided at the upper portion of the handle;

an output shaft protruding from the front portion of the case and rotated by the power transmitting portion; and a light-emitting element that illuminates a portion adjacent to the output shaft, the light-emitting element being fixed at a position below the case and above the trigger;

wherein the light-emitting element and the trigger are positioned on an identical imaginary cross-sectional plane perpendicular to the output shaft.

14. The power tool as claimed in claim 13, wherein the power transmitting portion includes a speed reduction mechanism.

15. The power tool as claimed in claim 13, wherein the power transmitting portion includes an impact mechanism.

16. A power tool comprising:

a motor;

a body housing the motor and having a front side;

a handle extending downward from the body and having a lower portion;

a battery pack detachably attached to the lower portion of the handle;

a hammer case provided at the front side of the body and having a front end and a first stepped portion;

an impact mechanism accommodated in the hammer case and driven by the motor;

an output shaft protruding from the front end of the hammer case and connected to the impact mechanism;

a flat ring-shaped substrate positioned at the first stepped portion and having a front surface, the output shaft extending through the ring-shaped substrate; and a plurality of light emitting elements provided at the front surface of the flat ring-shaped substrate, the front end of the hammer case being positioned ahead of the plurality of light emitting elements.

17. The power tool as claimed in claim 16, further comprising a ring-shaped transparent member positioned ahead of the ring-shaped substrate, the front end of the hammer case being positioned ahead of the transparent member.

18. The power tool as claimed in claim 17, wherein the hammer case is further formed with a second stepped portion, the transparent member having a portion positioned at the second stepped portion.

19. A power tool comprising:

a motor;

a body housing the motor and having a front side;

a handle extending downward from the body and having a lower portion;

a battery pack detachably attached to the lower portion of the handle;

a case provided at the front side of the body and having a front end, the case having a generally cylindrical portion;

a power transmission portion accommodated in the case and driven by the motor;

an output shaft protruding from the front end of the case and connected to the power transmission portion;

a flat ring-shaped substrate positioned at a radially outer side of the cylindrical portion of the case; and a ring-shaped transparent member positioned at the radially outer side of the cylindrical portion of the case and ahead of the ring-shaped substrate.

* * * * *